INVENTORS
ELMER A. ROBBINS
ROGER C. BRUOT
BY
Frask Jenkins & Hanley
ATTORNEYS

INVENTORS
ELMER A. ROBBINS
ROGER C. BRUOT

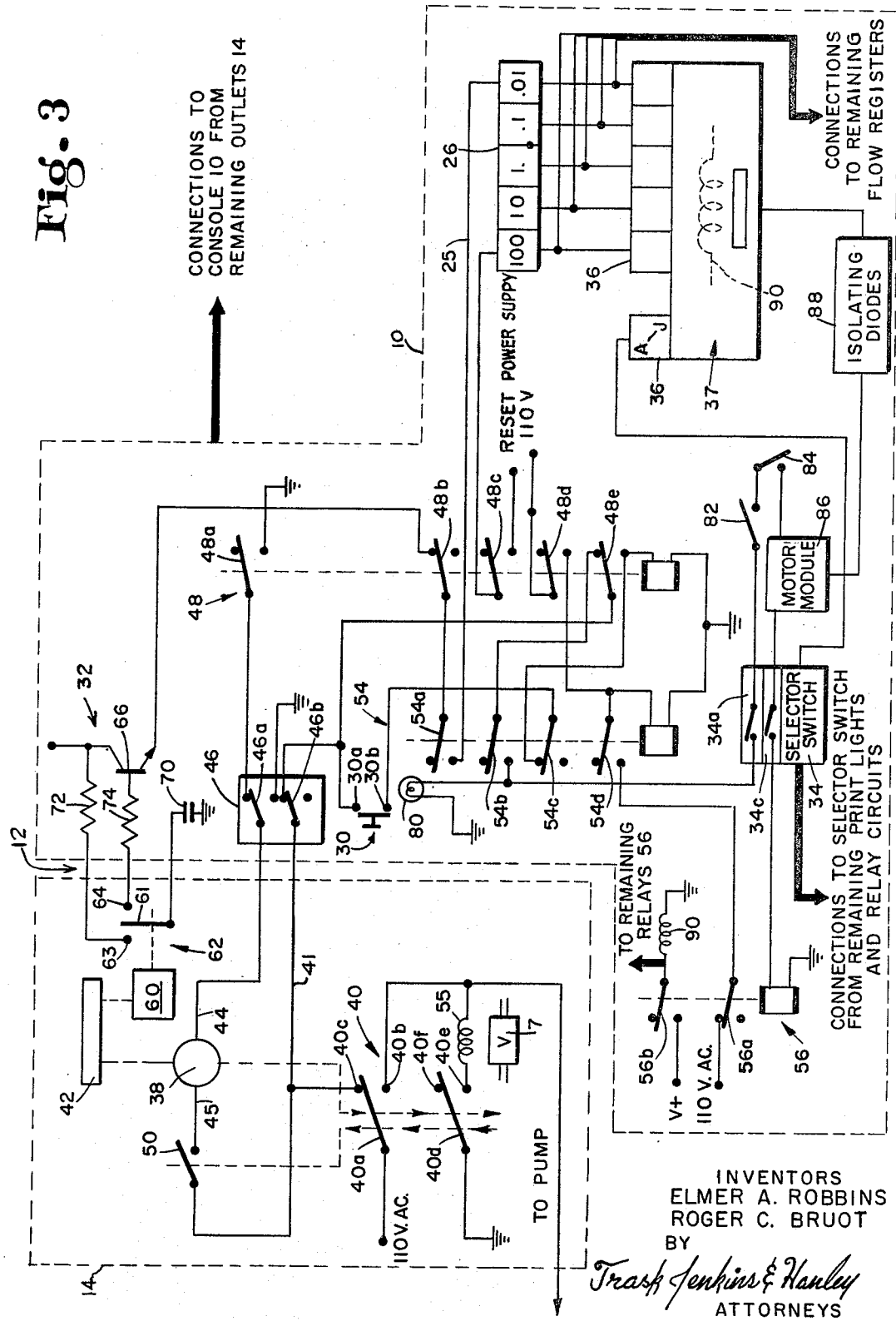

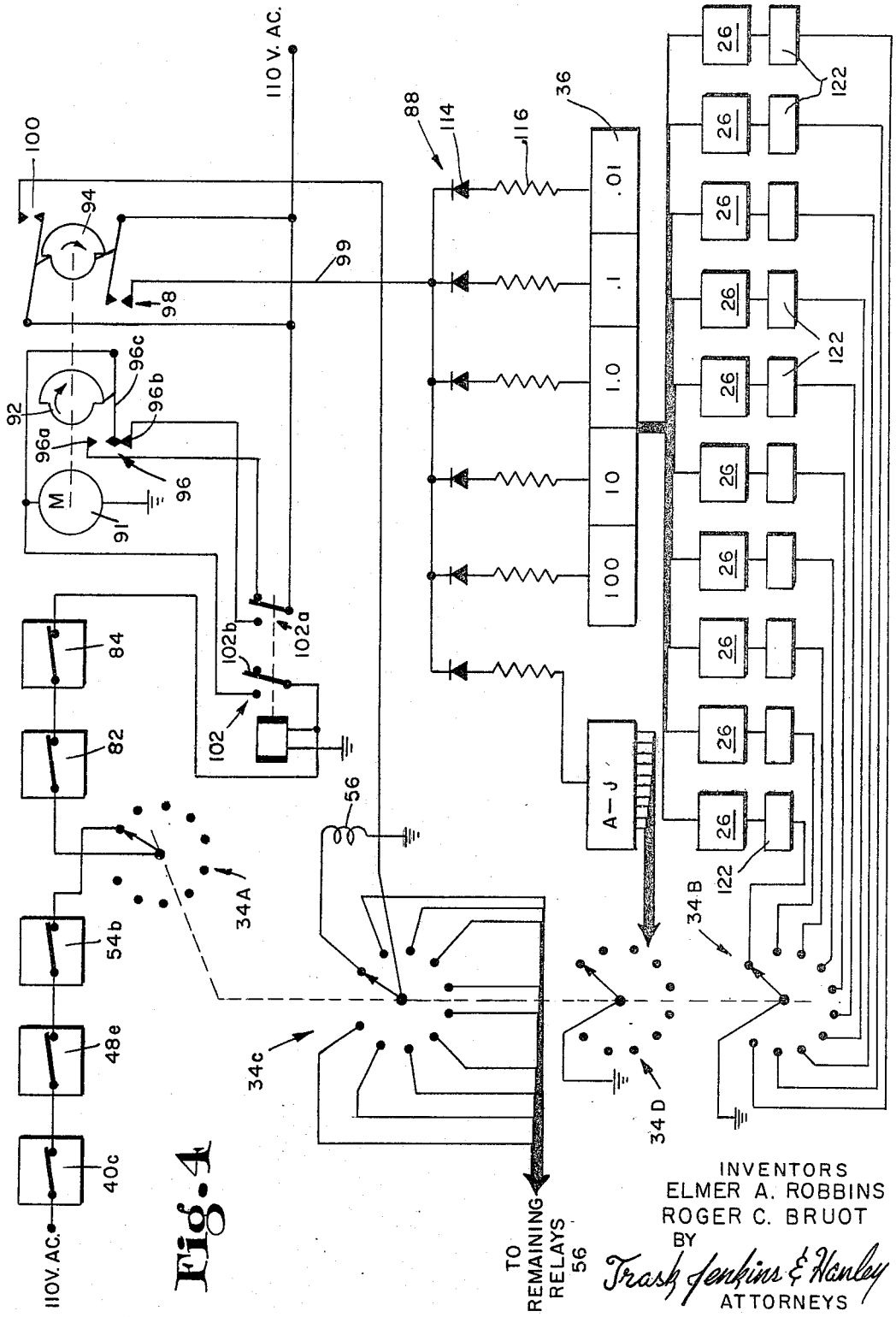

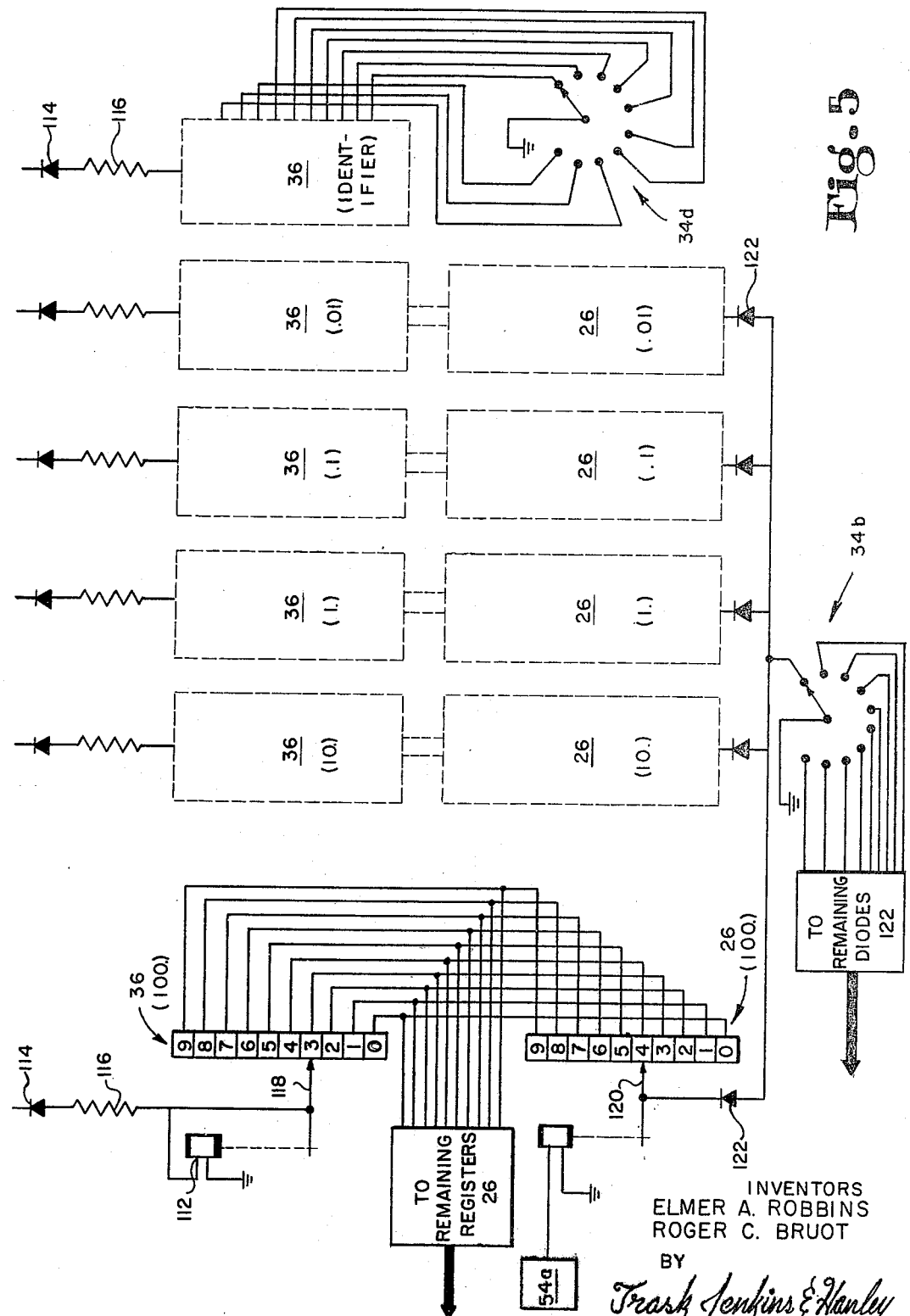

United States Patent Office 3,498,501
Patented Mar. 3, 1970

3,498,501
DISPENSING CONTROL SYSTEM
Elmer A. Robbins and Roger C. Bruot, Fort Wayne, Ind., assignors to Tokheim Corporation, Fort Wayne, Ind., a corporation of Indiana
Filed Mar. 1, 1968, Ser. No. 709,603
Int. Cl. B67d 5/06, 5/24, 5/26
U.S. Cl. 222—26                                32 Claims

ABSTRACT OF THE DISCLOSURE

A system including a single console for controlling and recording dispensing operations at a plurality of gasoline or other liquid fuel dispensing outlets. The control is provided by electrical connections between the console and the dispensing outlets, which connections disable the outlets until a console operator selectively activates them. For recording purposes, each dispensing outlet has a device which produces electrical pulses in proportion to the amount of fuel which is dispensed. The electrical pulses are fed to the console where they are applied to a pulse register which counts and records the pulses, thereby recording the amount of fuel dispensed at the outlet. A separate pulse register is coupled with each dispensing outlet, and a single printing device is provided for selective coupling with the several pulse registers. The printing device has a gallonage register and a card printer with a capacity equal to that of the outlet registers and the pulse registers. The console is operable to correlate the printing register to the same reading as any selected one of the pulse registers and a card is then printed to record the dispensing operation registered on the selected pulse register. Other dispensing operations can occur meanwhile.

BACKGROUND OF THE INVENTION

At certain gasoline and other automotive fuel dispensing stations, it is desirable to have centralized control of several dispensing stands or outlets. In such centralized control, it is desirable to prevent the use of each stand until approval has been given from the centralized control operated by a control operator. This frees the dispensing attendant to devote all of his time to giving service to customers, while the control operator handles charge transactions, makes credit checks, etc. in connection with the sales of fuel to the customers. Additionally, many customers, such as trucking companies, desire to have a printed receipt or record of fuel dispensed to its drivers. This invention provides a central console which operates to control a plurality of dispensing stands, which has separate registers to register the amounts of fuel dispensed respectively by the several stands. It also provides a single printing means which can be selectively coupled with each of the console registers and which operates to print a card record of the delivery from the coupled register and stand, while other stands and registers remain operable for independent operation.

SUMMARY OF THE INVENTION

In accordance with the invention a console is provided for controlling the use of a plurality of remotely positioned fuel dispensing outlets or stands and for recording the amounts of fuel dispensed by each outlet. The console is electrically connected with the dispensing outlets to prevent the use of any outlet until an approval signal is transmitted from the console. Each dispensing stand preferably has a power reset device which, when activated at the beginning of a dispensing operation, first drives the stand register to a zero reading and then conditions the stand and the pumping means for dispensing through the dispensing nozzle of that stand. The console controls this automatic reset device so that the reset and dispensing may not occur until an approval signal from the console has rendered the reset device operable.

In each dispensing operation, a meter in the stand measures the fuel flow and actuates a stand register which displays a reading of the fuel dispensed for viewing by the customer. The meter also drives a switch or other control for a pulse generator which generates electrical signals which are proportional to the fuel delivery from the dispensing stands, and these are transmitted to the control console where they are used to advance an individual register corresponding to the dispensing stand being operated. Thus the fuel flow from every stand is monitored both at the dispensing stand itself and at the control console.

The console contains a single card printer which can be selectively coupled electrically to each of the console registers. Upon such coupling, a register in the printer is automatically adjusted to the same reading as that of the selected flow register. The print register sets a card printing means by which a card inserted in the printing means may be printed to show the amount of fuel which has been dispensed at the dispensing stand corresponding to the coupled console register.

BRIEF DESCRIPTION OF THE DRAWINGS

The accompanying drawings illustrate the invention. In such drawings:

FIG. 3 is a combined schematic and block diagram of the control console and shows the connections between the control console and a single dispensing outlet;

FIG. 4 is a schematic diagram of the motor module shown in block form in FIG. 3, with certain connections; and FIG. 5 is a schematic diagram of the register connections within the console.

DESCRIPTION OF THE EMBODIMENT SHOWN

Figure 1:
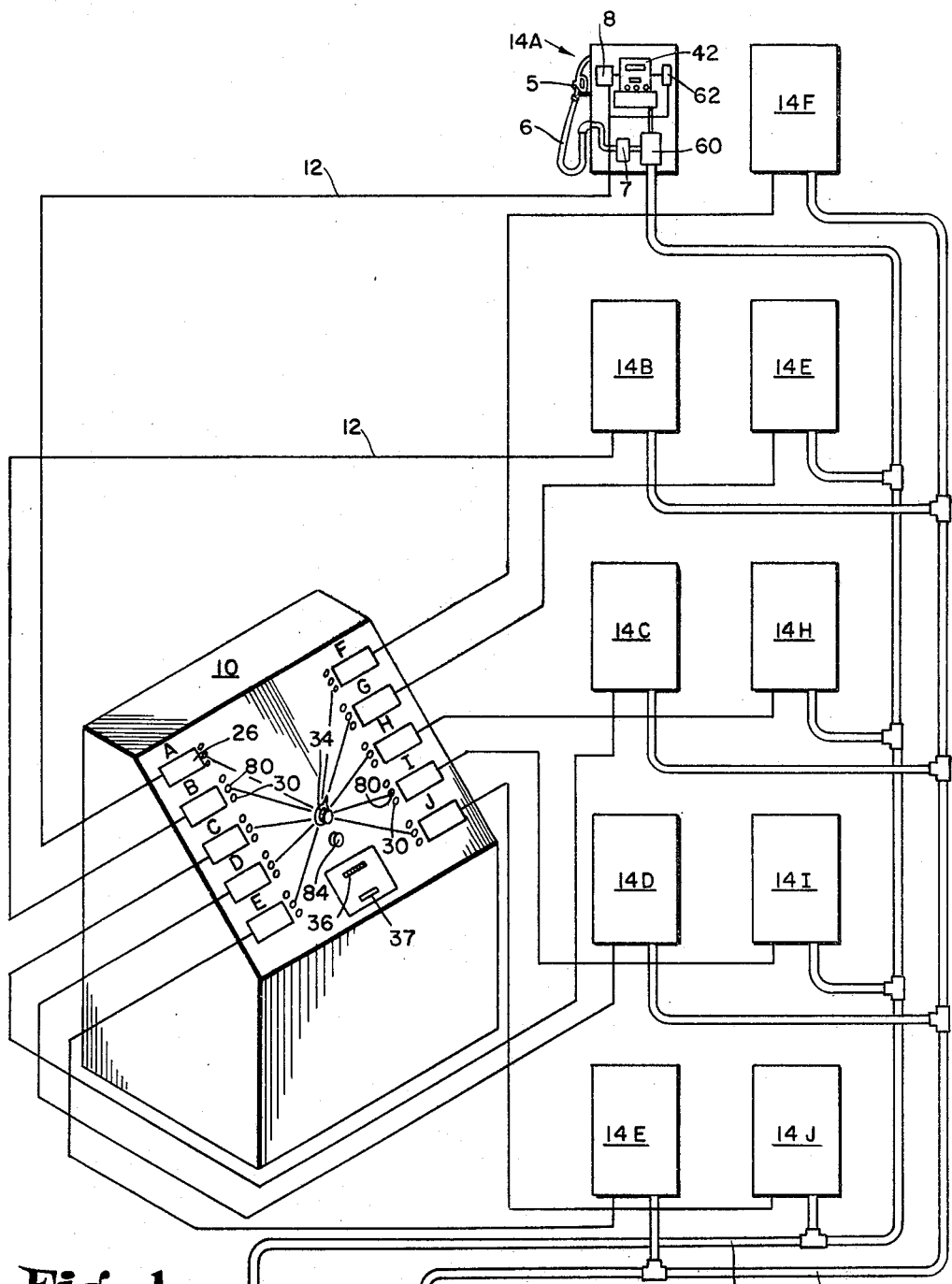
FIG. 1 is a block diagram of a dispensing control system embodying the invention, showing a control console connected to a plurality of dispensing outlets.

The system shown in FIG. 1 comprises a console 10 electrically connected by multiple conductors 12 to a plurality of dispensing stands 14 remotely positioned on islands on the driveway of a service station for automotive vehicles. The stands 14A–E are connected by piping 16a to a submerged pump 17a in a fuel tank 18a as for "regular" gasoline. The stands 14E–J are connected by piping 16b to a submerged pump 17b in a fuel tank 18b, as for the "high test" gasoline.

This submerged pump dispensing system is like that of U.S. Patent No. 2,812,111 except for the modifications required to accept the console control as herein described. In that system each stand 14 contains a meter 60 connected to a stand register 42 which displays a continuous reading of the quantity of fuel dispensed in each operation. In addition to the quantity or gallons reading the stand register commonly also displays a money price reading. The register is interlocked so that it must be reset to zero at the beginning of each dispensing operation, as by a power rest 8 of U.S. Patent No. 3,187,945, before dispensing can begin. The power to reset 8 controls a pump-motor switch and a flow control valve 7, and operates to close the pump motor switch and open the flow control valve after, and only after, the register has been reset to zero. Accordingly, the dispensing stand is inoperable until the reset has taken place, and is conditioned for dispensing when the reset cycle has been completed. Dispensing may then occur, upon actuation of the dispensing nozzle by the stand operator—either a service station attendant or in certain cases the customer himself.

Each stand also has a dispensing base 6 terminating in a manually-controlled nozzle. The nozzle is normally stored on a bracket with which is associated an actuator lever 5 which must be turned to ON position to actuate the stand and must be turned to OFF position before the hose nozzle can be hung in its stored position.

The console comprises a number of quantity registers 26A to J respectively connected for operation with the quantity registers of the several stands 14A to J, to show on the console the same readings as those on the several quantity registers of the stands. The console also includes a print register 36 combined with a printing device 37, and has a selector switch 34 by which the print register 36 and printing device can be selectively coupled to each of the several quantity registers 26 of the console. Each register 26 has associated with it an approval switch 30 for its corresponding stand, and signal lights for indicating the condition of such stand, e.g., that a dispensing delivery has been completed at such stand.

Figure 2:
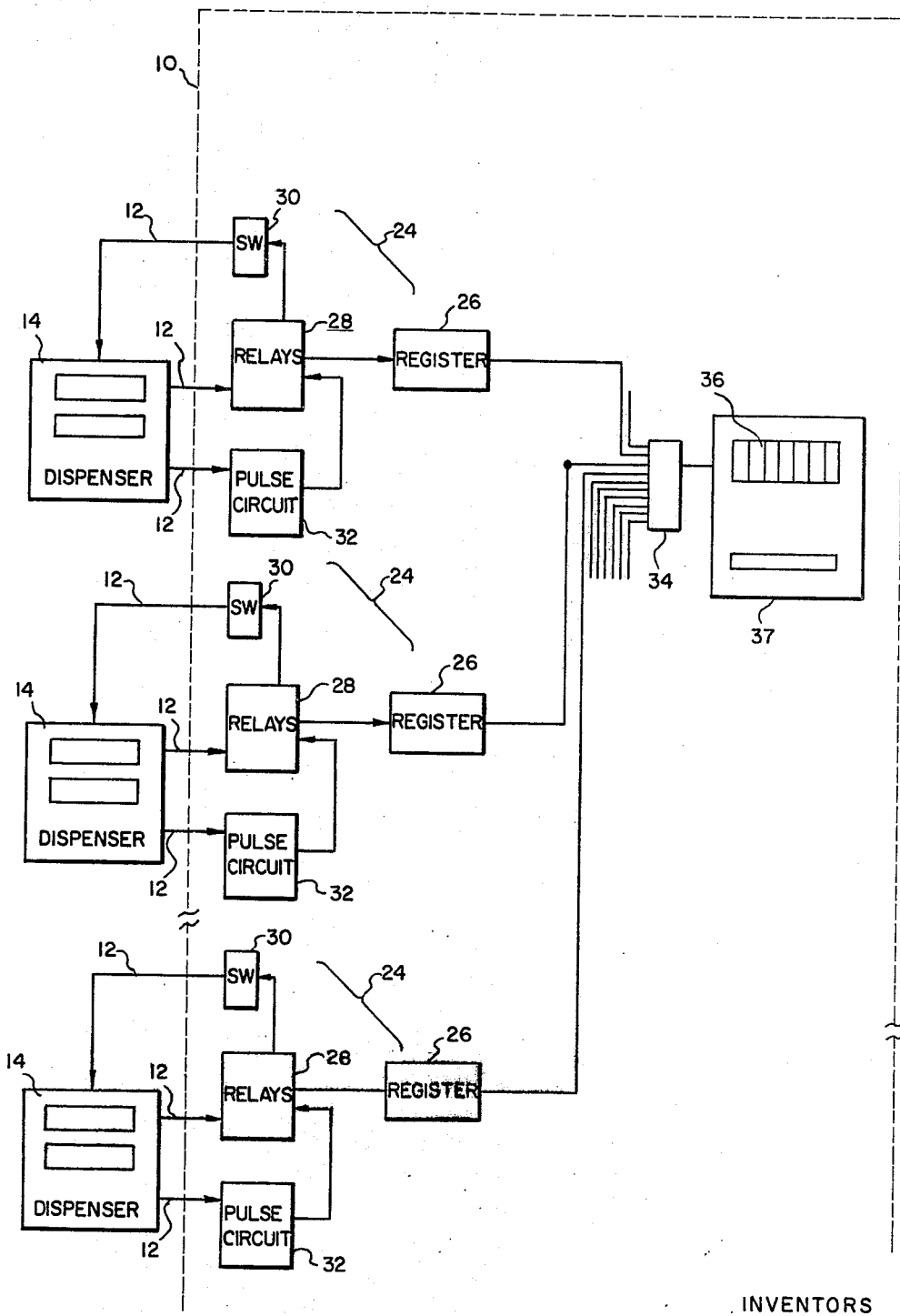
FIG. 2 is a block diagram of the control console.

As shown in FIG. 2 each dispensing outlet 14 is connected by its conductors 12 to an individual control circuit 24, and through such circuit 24 to an individual pulse or quantity register 26 in the console 10. Each control circuit 24 includes a relay module 28 and an approval switch 30. Each dispenser is disabled until its approval switch 30 is closed to complete a circuit from the relay module 28 to the power reset mechanism of the dispenser. The console operator may activate any of the dispensing outlets 14 by closing its approval switch 30 on the console.

Fuel delivery from each dispensing stand 14 is measured by a meter 60 which both drives the register 42 of the stand and actuates a switch 62 to control the generation of electrical signals in a pulse circuit 32 which forms a part of each control circuit 24. The circuit 32 generates pulses at a rate proportional to the rate of fuel delivery and such pulses are transmitted through the relay module 28 to the corresponding console register 26 ot advance the latter in proportion to the amount of fuel delivered at the dispensing stand.

The several console registers 26 can be selectively coupled by a slector switch 34 to a print register 36 in the console. When a particular console register is so coupled, the print register is driven to the same reading as that on the coupled register 26. The print register 36, in turn, sets the printer 37 for priting a record corresponding to the accumulated reading on the quantity register 26 at the end of the dispensing operation.

As each dispensing operation is completed, the operator positions the selector switch 34 to cause the print register 36 to correlate with the quantity register 26 containing the completed dispensing record, and thereafter actuates the printer 37 to print a card with the amount of fuel dispensed.

For each dispensing stand 14 to which it is connected, the control console 10 includes a relay circuit 28, a pulse circuit 32, an approval switch 30, and a register 26 for that stand. The console also includes a selector switch 34 by which each of the flow registers 26 can be connected to the print register 36, so that each and every register 26 can be selectively connected to control the printing means 37 to correlate its reading and print a record of each delivery from the corresponding stands.

As shown schematically in FIG. 3 the reset circuit in each dispenser 14 includes a reset motor 38 which, when energized, resets the dispenser register 42 to zero and then closes a switch 40 to energize the pump and to open the control valve 7 of the dispenser. The reset motor 38 has its ground lead 44 connected by one of the conductors 12 to the console 10 where it is coupled through a normally closed set of contacts 46a of a double-pole double-throw manually operated emergency switch 46, and through normally open contacts 48a of a first relay 48 to ground. The motor also has a supply lead 45 which is connected through a manual switch 50 to a contact 40c of the switch 40. The switch 40 includes an arm 40a connected to a power source, preferably 110 v. A.C. and normally closed with the contact 40c. A second contact 40b of the switch is connected to the fuel pump which supplies the dispenser 14. A second switch arm 40d, connected to ground, is normally closed with an open contact 40f and is movable to engage a contact 40e connected to a coil 55 which is operable to open the normally closed control valve 7 of the dispensing stand. The manual switch 50 is closed by the hose lever 5 of the dispenser 14 when the nozzle is removed and that lever moved to ON position. Contact 40c of the pump switch 40 is also connected through a conductor 41 and through a second set of contacts 46b of the emergency switch 46 to one contact 30a of the approval switch 30, the other contact 30b of which is connected through normally closed contacts 54c of a second relay 54 to the coil of the first relay 48.

With the relays 48 and 54 in normal position, as shown in FIG. 3, the ground circuit for the reset motor 38 is open at the open contact 48a, and the dispenser 14 is inoperable. When its approval switch 30 is closed, the first relay 48 is energized to close the contacts 48a and hence to close the ground circuit for the reset motor. The reset cycle can then be initiated by removing the nozzle and pivoting the control lever 5 to close the switch 50 and to energize the motor 38. When energized, the reset motor drives the dispensing stand register 42 to its zero position and then, by a cam, closes the switch 40 to energize the fuel pump and the coil 55 of the control valve 7; and thereby conditions the stand for dispensing.

The purpose of the emergency switch 46 is to permit the dispenser 14 to be operated independently of the approval switch 30. When the switch 46 is thrown, its first arm engages the normally-open contact of the set of contacts 46a which connects the ground lead 44 of the reset motor directly to ground, and its second arm opens the normally closed connection to approval switch 30. In this way, the ground return circuit for the motor is completed and the dispenser 14 can be operated solely under control of the dispenser lever 5 and the switch 50 which connects the motor supply lead 45 through the pump switch 40 to the power source.

In normal operation, when the first relay 48 is closed by momentary closure of the approval switch, the contacts 48e of such relay 48 connects the normally closed contact 46b of the switch 46 to the coil of the first relay 48, which applies the 110 v. source voltage from the pump switch 40 to the coil of the first relay 48 and latches such relay in its energized state.

Each console quantity register 26 is of the known type which is energized forward in successive steps by successive electrical pulses transmitted to it. Preferably the register is a 5-place register arranged to advance one step in its lowest-order place for each 1/100 of a gallon dispensed, so that it will record 999.99 gallons in 1/100 increments. The register is arranged to reset itself to zero when connected to a reset power supply.

When the first relay 48 is closed it couples a reset power supply through its contacts 48c to its associated console register 26 to reset that register 26 while the dispensing stand register is being reset. Through another set of contacts 48d, the relay 48 connects a 110 v. A.C. supply to the coil of the second relay 54, which closes that relay, which is then latched in its energized condition through its contacts 54d and through the contacts 56a of a deenergized third relay 56. The first relay is deenergized when the reset cycle in the dispensing stand 14 is completed and throws the switch 40 and thereby opens the contact 40c to deenergize the reset motor circuit and the lead 41 which supplies the latching voltage to the coil of relay 48. The second relay 54 remains energized however, since it receives its latching voltage from the deenergized third relay 56.

As fuel is dispensed from the dispensing stand 14, its meter 60 measures the amount of fuel delivered and drives a shaft which operates the dispensing stand register 42. The meter 60 also drives a single-pole double-pole switch 62 to open and close that switch at a rate proportional to the rotation of the meter shaft, in the relationship of 100 times per gallon of fuel delivery from the dispensing stand, so that each cycle of the switch 62 represents 1/100 of a gallon of fuel delivered.

The switch 62 controls the pulse generator 32 of the associated control set 24. The pulse generator comprises a transistor 66 having its principal electrodes connected between a voltage source and the appropriate register 26 in the console 10. The arm 61 of the switch 62 is connected through a capacitor 70 to ground. One contact 63 of the switch is connected through a dropping resistor 72 to the positive voltage source which is connected to the collector of the transistor 66. The other contact 64 of the switch 62 is connected through a current limiting resistor 74 to the base of the transistor 66, whose emitter is connected to the contacts 48b of the first relay 48. When the first relay is deenergized the emitter of the transistor is coupled through the contacts 48b to the contacts 54a of the second relay 54 which, when energized, connect the emitter of the transistor to the drive lead 25 of the quantity register 26 for the particular dispensing stand which is being operated.

In operation of the pulse circuit 32, when the arm 61 of the switch 62 engages the supply contact 63, current flows through the switch to charge the capacitor 70 with a positive voltage at its connection to the arm 61, and when the switch 62 is thrown over to the contact 64 the positive voltage from the capacitor 70 is connected through the limiting resistor 74 to the base of the transistor 66. This causes the transistor to conduct and discharges the capacitor. The conduction of the transistor produces a pulse of current which is applied through the contacts 48b and 54a of the first and second relays to advance the lowest-order wheel of the register 26 by one increment representing 1/100 of a gallon. The register advances each next higher-order wheel one step for each 10 steps on the lower-order wheel, and is capable of registering up to 999.99 gallons in increments of 1/100 gallon.

When a dispensing operation has been completed, the lever 5 of the dispensing stand is manually thrown so that the nozzle can be replaced on its storage bracket. Such lever movement both opens the switch 50 and mechanically releases the switch 40 to its normal position as shown in FIG. 3. This deenergizes the pump circuit and the coil 55 for the control valve 7, and inactivates the stand. It also re-connects contact 40c to the 110 v. A.C. supply which supplies voltage through the contacts 48e of the 1st relay 48 and through the contacts 54b of energized relay 54, to an indicator lamp 80 and to a terminal on the selector switch 34. The other side of the print light 80 is connected to ground and the light comes on to indicate that the dispensing operation has been completed at the indicated stand, and that a printed record of said operation is ready to be obtained.

To connect the printer for printing the record of a delivery at a particular stand 14, the selector switch 34 on the console must be turned to its appropriate position as indicated on the face of the console. The selector switch comprises four banks of sweep switches 34A–D, as indicated in FIG. 4. Each bank has a sweep arm which selectively engages ten contacts respectively associated with the controls for the ten stands 14A–J and the corresponding ten registers 26A–J on the console.

When the selector switch is positioned for recording the delivery total of a particular stand 14 and register 26, the switch bank 34A (FIGS. 3 and 5) couples the 110 v. voltage (from relay switch 54b as described above) to a card switch 82 which is closed when a card or ticket is inserted in the printing means 37. Connected in series with the card switch 82 is a manually operated print switch 84 on the control console. Such print switch 84 is connected to a motor module 86 comprising a plurality of switches which are sequentially opened and closed by motor-driven cams within the module 86. (Described below.) Such switches supply a signal through an isolating circuit 88 to the print register 36 to cause such print register to correlate its indicators with those of the selected console register 26. After the print-register indicators are correlated, a signal is sent by the module 86 through the selector switch bank 34B to energize the third relay 56 (FIG. 3). Its contacts 56b then energizes a print coil 90 which causes the printing means 37 to stamp the print register reading on the card or ticket. The printing means 37 is a known and commercially available printer.

The motor module 86, as shown in FIG. 4, comprises a relay 102, and a small electric motor 91 which drives a pair of cams 92 and 94 for sequentially operating three switches 96, 98 and 100. Power is supplied to the motor through the relay 102 when such relay is energized by the 110 v. supply when the print switch 84 is closed. The circuit for such supply, as shown in FIGS. 3 and 4, is completed when a dispensing delivery has been made, the dispenser lever 5 has been thrown to permit the nozzle to be returned to its stored position, a card has been inserted in the printer to close the card switch 82, and the print switch 84 has been closed manually by the console operator. Under these conditions, the circuit is closed through the pump switch 40 from its arm 40a through contact 40c; through contacts 48e of the deenergized first relay 48; through contacts 54b of the second relay 54 which is latched in by the deenergized third relay 56; through the selector switch 34A, and through the card switch 82 and the print switch 84 to the coil of the motor module relay 102.

The arm of the relay switch 102b is connected to the 110 v. supply circuit just described, and the normally open contact is connected to the motor 91. The arm of relay switch 102a is connected to a 110 v. supply and its contacts are connected respectively to the contacts 96a and 96b of the switch 96 controlled by the cam 92. The arm 96c of that switch is connected to the motor 91 supply lead and hence to the normally open contact of the switch 102b. Accordingly, when the relay 102 is energized by closure of the print switch, it is initially latched closed through its contacts 102a and 102b and through the closed contacts 96b of the cam switch 96. This starts the motor 91. Switch 96 is controlled by the first cam 92 and for a portion of the cam's rotation the arm 96c is held against contact 96b. As the cam 92 continues to rotate, the arm 96c is swung against its other contact 96a thereby removing the latching voltage from relay 102 and allowing that relay to open. The motor continues to rotate, however, since the 110 v. source voltage is recoupled to the motor through the arm of relay contacts 102a and through the contact 96a and arm 96c of switch 96. After one complete revolution of the cam 92 the arm 96c of switch 96 returns to contact 96b and the motor is deenergized. Thus the function of the relay 102, the switch 96 and the cam 92 is to control the motor so that it makes exactly one revolution and stops.

The second cam 94 controls switches 98 and 100. As rotation of cam 94 begins it closes switch 98 to apply 110 v. source to the isolating circuit 88 for a certain period of time, sufficient to ensure that the reading on the print register 36 is correlated with the reading on the selected quantity register 26, in the manner described below. At that time, the switch 98 is reopened and switch 100 is closed. Switch 100 couples the 110 v. source voltage through the selector switch bank 34c to the coil of the third relay 56. Such third relay 56 is then energized and by the opening of its contacts 56a unlatches the second relay 54. It also energizes the print coil 90 through its contacts 56b. As the motor 91 finishes its single revolution, the second cam 94 reopens switch 100, so that both switches 98 and 100 are re-positioned for the next cycle.

The print register 36 is correlated with the selected console pulse register 26 by the means shown schematically in FIG. 5. The print register contains an actuating coil 112 for each order section of the register. The coil 112 for the 100's section is shown in FIG. 5. All such coils are connected through separate isolating diodes 114 to a common lead 99 (FIG. 4) leading from the fixed contact of the cam switch 98. Energization of any such coil 112 by a pulse, causes the register wheel of that section to advance one step.

When the cam switch 98 is closed in the early part of the cycle of the motor module 86, this applies 110 v. A.C. to the isolating diodes 88 and through them to the coils 112 of the print register and, in the manner described below, to the corresponding sections of the selected quantity register 26, and from them through the selector switch bank 34B to ground.

The isolating circuitry 88 comprises a plurality of diodes 114 having their cathodes connected together and to the switch 98. The anodes of the diodes are connected through resistors 116 to the individual stepping coils 112 of the print register 36. (FIGS. 4 and 5.) The purpose of the resistors is to limit the voltage which is applied to the various coils 112. The diodes 114 half-wave rectify the 110 v. signal so that a series of negative pulses are applied to all of the stepping coils 112 of the print register, and to the movable arm 118 of each register section. Each such arm is stepped one place for each negative pulse received by the corresponding coil 112. The print register 36 has at least a five-place reading as do the registers 26, and the 1/100 place or section of the print register is coupled directly to the 1/100 place or section on each flow register 26. Similarly, the 1/10, 1, 10 and 100 places or sections of print register are coupled directly to the corresponding places on all the quantity registers 26. Each register 26 has a moving arm 120, and such arms are coupled individually through isolating diodes 122 to a common point which is connected through the selector switch bank 34B to ground. When the movable arm 118 on one place of the print register 36 is stepped to the reading which is the same as the reading of the movable arm on the corresponding place of the selected quantity register 26, current flows through a shunt circuit from that arm 118 to the contact at such reading position on the print register, through a wire to the contact at the corresponding reading position on the quantity register 26, thence through the moving arm 120 of that register 26 and through the diode 122 and selector switch 34B to ground, rather than to the stepper coil 112 of the print register, and therefore the print register remains in its correlated position even though the negative pulses continue to be applied thereto. The function of the diodes 122 is to isolate the selected quantity register 26 from the remaining quantity registers 26 of the console, since there are direct connections between the several places of the print register 36 and the corresponding places or sections of all of the flow registers 26 on the console.

As has been indicated, the selector switch 34 comprises a gang-switch having a plurality of selectable positions corresponding to the number of dispensing outlets 14 coupled to the console 10, and having four banks or layers 34A, B, C and D. The contacts at each position are connected respectively to the controls for the several outlets. Layer 34A has its contacts each connected to the normally open contacts of a switch 54b, in parallel with a print light 80, and has its arm connected to the card switch 82 (FIG. 4). Therefore, when a print light 80 goes "on," indicating that a dispensing operation has been completed, the selector switch 34 is turned to select that outlet so that a card may be printed. The contacts on layer 34B are connected to the isolating diodes 122 of the registers 26 for the several outlets, and the arm of layer 34B is connected to ground, so that the printing register will correlate its reading with the reading on the selected quantity register 26, and will be unaffected by the remaining quantity registers 26. The contacts of layer 34C are connected respectively to the coils of the third relays 56 of the several control sets, so that the proper relay 56 energized to release the proper second relay 54, corresponding to the proper outlet 14. Accordingly, a relay 54 will not be deenergized prematurely, nor the printing coil energized prematurely, but both events will occur only after the outlet is selected by the switch 34. The contacts of the layer 34D are conveniently connected respectively to a digit or letter selector on an additional print register section, and the arm of layer 34D is grounded, so that the printing register prints an identifying letter (A–J) corresponding to the selected outlet 14 and register 26.

In summary, the operation of the system is as follows: A dispensing outlet 14 is incapable of operation until its approval switch 30 on the console has been depressed by the console operator (unless the emergency switch 46 is thrown). When the approval switch is pressed, 110 v. current is applied through the reset switch 40 to its contact 40c to energize the first relay 48, which is latched closed by a circuit through its switch 48e. This in turn energizes the second relay 54 which is latched closed by a circuit through switch 54d from switch 56a of the third relay 56. The closed first relay completes the ground path for the reset motor 38 through its contacts 48a, and a dispensing operator may then remove the dispensing nozzle from the stand, throw the actuating lever 5 and thereby energize the outlet. The reset motor 38 closes the switch 40 to energize the pump, and open the control valve 7, after first resetting the dispensing register 42 to zero. The reset motor is deenergized when it closes the switch 40.

As fuel is dispensed the meter 60 causes the switch 62 to open and close at the rate of 100 times per gallon of dispensed fuel. The opening and closing of the switch 62 applies pulses to the transistor 66 in the console 10 and these pulses are applied through the first and second relays to the corresponding console pulse register 26 to register delivered gallonage on the proper console register.

Upon completion of the dispensing operation the manual operated lever on the dispensing stand is thrown to its original position, thereby moving the switch 40 to its original position and applying 110 volts through its arm 40a to its contact 40c. This voltage is applied through the contacts 48e of the deenergized first relay 48 to the contacts 54b of the energized second relay 54, and from there to the print light 80 and through the selector switch 34A, the card switch 82, and print switch 84, to the motor module 86. When the selector switch is positioned to select the proper outlet 14, and when a card has been inserted into the printing means 37 and the print switch 84 is closed, the motor module is activated to first correlate the print register reading with the selected flow register reading and then print the card.

Thus, it can be seen that this invention provides centralized control of a plurality of dispensing outlets; a centralized monitor of the dispensing operations; and, a single printing means for use in printing a record of any of the monitored readings.

We claim:

1. A system for controlling the use of a fuel dispensing station from a remote location, comprising
   an electric reset motor at said dispensing station for establishing predetermined initial conditions for operating said station, said motor being adapted to control the energization of a fuel pump for said station and having at least two leads adapted for connection to a power source, electrical control means for controlling the supply of power to said motor, said means including a relay controlled from said remote location and located remotely from said station for energization to complete a conductive path to the power source for one of said motor leads.

2. The invention as set forth in claim 1 with the addition of first and second switches at said station, said first switch being manually operable by a lever and said second switch being thrown to one position by the lever and to a second position by the motor, the other of said motor leads being coupled through the first switch and through said one position of the second switch to the power source, said second switch being adapted when in said second position to connect the pump to the power source, an approval switch positioned at said remote location and having one side connected through said one position of said second switch to the supply of power and having its other side connected to the coil of said relay, whereby said first switch and approval switch are closed to energize the relay and the reset motor, said reset motor being deenergized by throwing said second switch into said second position after the initial conditions have been established.

3. A system for controlling the dispensing of fuel at a plurality of dispensing stations, comprising a plurality of dispensing stations each having a dispensing nozzle, a meter connected to measure fuel delivery therefrom, a manual control element movable between ON and OFF position to initiate and terminate a delivery cycle at the station, and interlock means having a normal locking condition in which it renders the station inoperable and having an actuated condition in which it activates the station for operation, movement of said manual control element to OFF position being operative to cause said interlock means to take its said normal locking condition and inactivate the station, a control station having an indicator means for each of said plurality of dispensing stations, operable in response to movement of said element to OFF position to indicate the completion of delivery at such station, an approval unit at such control station for each dispensing station, connected to control the interlock means of such station, and operable to actuate such interlock means to its actuated condition for operation of such station to make a new delivery.

4. A system for controlling the dispensing of fuel at a plurality of dispensing stations, comprising a plurality of dispensing stations each having a dispensing nozzle, a meter connected to measure fuel delivery therefrom, interlock means for inactivating the station upon the completion of each delivery from the station, and a first register for registering the fuel delivered at each dispensing station, said register being responsive to the operation of the meter for such station, a control station having an indicator means for each of said plurality of dispensing stations, operable to indicate the completion of each delivery at such station, an approval unit at such control station for each dispensing station, connected to control the interlock means of such station, and operable to condition such interlock means for operation of such station to make a new delivery; and reset means for each said register, said reset means being controlled by the approval unit for the dispensing station and operating to reset the register to zero reading for each new delivery.

5. A system as set forth in claim 4 in which the interlock means for each dispensing station comprises a reset mechanism operable to first reset the register of such station to its zero reading and thereafter to activate the station for a dispensing delivery, and an activating circuit for each such reset mechanism, said approval unit for each control station including a normally-open switch controlling the activating circuit for the reset mechanism of such station.

6. A system as set forth in claim 4 in which the interlock means for each dispensing station includes a reset motor operable in sequence to reset the register of such station and to actuate a control member to condition the dispensing stand for delivery, and a drive circuit for such reset motor, and the approval unit for each control station includes a normally-open switch controlling the drive circuit for the reset motor of such dispensing station.

7. A system as set forth in claim 6 with the addition that the drive circuit of the reset motor also includes a switch responsive to manual control at the dispensing station.

8. A system as set forth in claim 6 in which each reset motor drive circuit includes a normally-open switch of a latching relay, the approval unit for each dispensing station comprises an approval switch to close the latching relay for the reset motor of such station, and said reset motor at the end of its cycle operates to unlatch the said latching relay.

9. A system as set forth in claim 8 further comprising a holding relay for each dispensing station, connected to be energized when said latching relay is closed, and which operates upon such energization to inactivate the approval unit.

10. A system as set forth in claim 4 which includes a second register at the control station for each dispensing station for registering the fuel delivered from such dispensing station, said first and second registers both being responsive to operation of the meter at such dispensing station, and means responsive to operation of the approval unit for each dispensing station for resetting both said first and second registers to zero reading for a new relivery.

11. A system for controlling the dispensing of fuel at a plurality of dispensing stations, comprising a plurality of dispensing outlets each connected to a separate fuel delivery meter, a meter register for each meter and responsive thereto to register deliveries completed from its connected outlet, a transfer register for receiving readings previously completed on a meter register, coupling means for selectively coupling said transfer register to any one of said meter registers, and operating means to transfer to the transfer register a reading previously registered on the meter register with which the transfer register is coupled.

12. A system as set forth in claim 11 in which the transfer register comprises a recording device, said operating means sets the recording device for making a record of the reading transferred from the meter register, with the addition of actuating means to thereafter actuate the recording device for making such record.

13. A system as set forth in claim 12 in which said recording device is a printer adapted to print on a removable card or the like.

14. A system as set forth in claim 11 in which the dispensing outlets are at spaced dispensing stations, each dispensing station comprises a dispensing outlet, a meter therefor, and a register responsive to such meter, a control station comprising said transfer register and an additional register for each dispensing station, which additional register is connected for operation concurrently with the register at such dispensing station, and said coupling means is operative to selectively couple the transfer register with the said additional registers.

15. A system as set forth in claim 11 further comprising transducing means connected to each fuel delivery meter for producing electrical signals proportional to the amounts of fuel delivered from the dispensing outlet, a control station comprising a plurality of registers respectively connected for actuation in response to the electrical signals from the transducing means connected to the several fuel delivery meters, said control station also comprising said transfer register, and including a manual selector switch for selectively coupling the transfer register to said meter registers.

16. A system as set forth in claim 15 in which each transducing means comprises a switch having an arm and two contacts, and the arm is driven by the meter alternately from one contact to the other, and circuit means including a capacitor which is charged when the arm engages one contact and discharges when the arm engages the other, to generate a series of electrical pulses each representing a predetermined quantity of fuel delivery measured by the meter.

17. A system as set forth in claim 11 in which said transfer register and meter register have a plurality of order sections, each order section of each meter register having a plurality of contacts sequentially engaged by a contact arm movable with the register and arranged for connection to one terminal of a correlating circuit, each order section of the transfer register having a corresponding plurality of contacts respectively connected to the contacts of the corresponding order section of all the meter registers, each order section of the transfer meter also having a driven contact arm arranged for connection with the other terminal of the correlating circuit, and electrical drive means for sequentially advancing such arm, the contact arms and contacts for each pair of connected order sections being connected in shunt with said electrical drive means for the driven contact arm to inactivate such drive means when the connected sections are correlated.

18. A multiple-outlet fuel dispensing system, comprising a plurality of dispensing outlets each connected to a separate fuel delivery meter, an electric signal generator driven by each said meter, a control station including a control register for each dispensing outlet and adapted to be operated by the electric signal generated by the generator for such outlet, a control circuit for coupling each generator to its control register, including an approval unit, and operative upon actuation of such approval unit (a) to condition the dispensing outlet and the control register for a dispensing operation, (b) to provide an operating connection from the generator of such outlet to the control register for such outlet, for registering a dispensing delivery from such outlet, and (c) upon completion of such delivery to establish an electrical output at an output terminal of the control circuit, said control circuit having a reset terminal and including means to reset the control circuit for a new delivery cycle upon energization of said reset terminal, a print register, a selector switch for selecting any of the dispensing outlet control registers for coupling with the print register, a motor module for producing in sequence a correlating signal for the print register and a reset signal for a control circuit, said selector switch having a plurality of jointly operable sections, including (a) a first section to selectively connect said output terminal of the selected control circuit to actuate the motor module, (b) a second section to selectively establish a correlating circuit between the print register and the selected dispensing outlet control register, and (c) a third section to selectively connect the motor module to transmit its reset signal to the reset terminal of the selected control circuit.

19. A multiple-outlet fuel dispensing system, comprising a plurality of dispensing outlets each connected to a meter and register and having a reset mechanism operative in sequence to reset the register and condition the outlet for dispensing delivery, a control station having an approval unit, a control register and a control circuit for each outlet, and a print register, each control circuit being operable to have in sequence:

(a) a first condition in which it inactivates the reset mechanism of its outlet in a status which inactivates the outlet, (b) a second condition, responsive to actuation of said approval unit, in which the reset mechanism is actuated to complete its reset cycle, (c) a third condition, responsive to completion of such reset cycle, in which it connects the outlet meter to drive the control register, (d) a fourth condition, responsive to completion of a dispensing delivery, in which it inactivates the reset mechanism and establishes connections for selective correlation of the print register with the control register and completion of a print cycle with that correlation, and from which fourth condition the control circuit returns to the first condition in response to completion of such print cycle, and a selector for selectively coupling the print register for a print cycle in correlation with the control register and control circuit for any of said outlets.

20. A multiple-outlet fuel dispensing system, comprising a plurality of dispensing outlets, each connected to a meter and register and having reset mechanism for the register, transducing means connected to the meter for producing electrical output signals in proportion to the dispensed fuel measured by the meter, a control station having a plurality of control registers respectively connected to the transducing means of the meters at the several outlets for separately recording the amounts of fuel dispensed at such outlets, means for controlling the use of each outlet from said control station, comprising for each dispensing outlet, a reset motor for establishing predetermined initial conditions for operating said outlet, said motor being adapted to energize a fuel pump for said outlet and having at least two leads adapted for connection to a power source, electrical control means for controlling the supply of power to said motor, said means including a relay controlled from said station for energization to complete a conductive path to the power source for one of said motor leads.

21. The system set forth in claim 20 with the addition of a print register at said control station and means to correlate such print register with any of said control registers.

22. A remote registry system comprising a device having an operating member, the movement of which is to be remotely registered,
   a switch having a pair of contacts connected to be opened and closed in sequence by the movement of said member,
   circuit means including a capacitor which is charged when one contact is closed and discharges when the other contact is closed, to generate a series of pulses each representing a predetermined movement of the operating member,
   a semi-conductive device having principal conducting electrodes connected between a potential source and a pulse-transmitting line,
   said semi-conductive device having a control electrode connected to said switch to receive the capacitor discharge to thereby render the device conductive to transmit a pulse from the potential source to the pulse-transmitting line,
   and a pulse-responsive register connected to said pulse transmitting line for operation in response to said pulse generation.

23. A remote-registry system as set forth in claim 22 with the addition of a current-limiting resistor between the switch and the control electrode.

24. A remote-registering system as set forth in claim 22 in which said switch comprises an arm which is closed with the two contacts alternately, one contact is connected to a potential source for charging the capacitor, the arm is connected to the capacitor, and the other contact is connected to the control electrode.

25. Fuel dispensing apparatus, comprising
   a fuel dispensing outlet,
   a meter connected to measure the amount of fuel delivered from the outlet and having an output shaft operating in proportion to such delivery, and
   a remote registry system as set forth in claim 22 in which the said operating member comprises the said meter shaft.

26. Fuel dispensing apparatus as set forth in claim 25, further comprising
   amplifying means having a normally open power circuit connected between a potential source and a pulse transmitting line,
   said amplifying means also having a control circuit connected to said switch to receive the capacitor discharge and operative in response thereto to close the power circuit and render the same conductive to transmit a power pulse from the potential source to the pulse transmitting line,
   the pulse-responsive register being connected to said pulse-transmitting line.

27. Fuel dispensing apparatus as set forth in claim 26 in which the amplifying means comprises a semi-conductor device.

28. A system for selectively correlating a secondary register with any of a plurality of primary registers, comprising
   a plurality of primary registers and a secondary register, each having a plurality of order sections,
   each order section of each primary register having a plurality of contacts sequentially engaged by a contact arm movable with the register and arranged for connection to one terminal of a correlating circuit,
   each order section of the secondary register having a corresponding plurality of contacts respectively connected to the contacts of the corresponding order section of all the primary registers,
   each order section of the secondary register also having a driven contact arm arranged for connection with the other terminal of the correlating circuit, and electrical drive means for advancing such arm to make sequential contact with its contacts,
   the contact arms and contacts for each pair of connected order sections being connected to inactivate the drive means for the driven arm thereof when the connected sections are correlated,
   and means to select the primary register with which the secondary register is correlated.

29. A system as set forth in claim 28 in which the contact arms and contacts for each pair of connected order sections is connected in shunt with the electrical drive means for said driven contact arm.

30. A system as set forth in claim 28, which includes selection switch means having a separate selection contact for each primary register,
   a correlating circuit arranged to supply a series of actuating electrical pulses to the contact arms of the secondary register and their drive means,
   the contact arms of the several primary registers being connected to said selection contacts and said switch means being operative to selectively connect the said arms of such primary registers in the correlation circuit and thereby to select which of the primary registers will determine the correlation of the secondary register.

31. A system as set forth in claim 30 with the addition that the contact arms of the several sections of each primary register are connected to a common selection terminal through isolating connections.

32. Register correlating means, comprising
   a primary register having a plurality of first contacts, a first contact arm for sequentially engaging said contacts, and an input drive for driving said arm,
   a secondary register having a corresponding plurality of second contacts respectively connected to the corresponding first contacts of the primary register, and a contact arm for sequentially engaging said second contacts,
   a correlating drive for driving the contact arm of the secondary register,
   and a shunt circuit including said first and second contacts and said first and second contact arms for inactivating said correlating drive when the secondary register becomes correlated with the first register.

References Cited

UNITED STATES PATENTS

| | | | |
|---|---|---|---|
| 2,540,617 | 2/1951 | Hazard et al. | 222—30 X |
| 3,027,048 | 3/1962 | Rapisarda | 222—35 |
| 3,100,062 | 8/1963 | Spalding | 222—35 |
| 3,220,606 | 11/1965 | Mesh et al. | 222—35 |
| 3,236,415 | 2/1966 | Parker | 222—35 X |
| 3,353,710 | 11/1967 | Romanowski | 222—20 X |

SAMUEL F. COLEMAN, Primary Examiner

H. S. LANE, Assistant Examiner

U.S. Cl. X.R.

222—30, 35, 76